Sept. 25, 1962    B. E. WILLIAMS    3,055,152
PROCESS OF AND APPARATUS FOR MAKING CONTAINERS
Filed July 21, 1958    6 Sheets-Sheet 1

INVENTOR.
Beverly E. Williams,
BY Brown, Jackson,
Boettcher & Dienner
Attys.

Sept. 25, 1962  B. E. WILLIAMS  3,055,152
PROCESS OF AND APPARATUS FOR MAKING CONTAINERS
Filed July 21, 1958  6 Sheets-Sheet 6

INVENTOR.
Beverly E. Williams,
BY Brown, Jackson,
Boettcher & Dienner
ATTYS.

United States Patent Office 3,055,152
Patented Sept. 25, 1962

3,055,152
PROCESS OF AND APPARATUS FOR
MAKING CONTAINERS
Beverly E. Williams, 1105 Bromfield Road,
Hillsborough, Calif.
Filed July 21, 1958, Ser. No. 750,027
19 Claims. (Cl. 53—29)

This invention relates to the manufacture of cartons or containers from paper, cardboard, pressed fiber board and the like. Although not limited thereto, the herein described method and apparatus are particularly concerned with the manufacture of more or less rectangular cartons that are useful as containers for milk, fruit juices or other fluids or fluid like materials.

Particularly in the dairy industry, the concept of packaging fluids such as milk or cream for consumer distribution in sealed paper cartons that used once can be then thrown away has been recognized as having many advantages. There is no problem of glass breakage, returned bottles which may be lost, stolen or forgotten, nor of cleaning and sterilizing the returned bottles for reuse. For these and other advantages gained thereby, paper cartons have to a considerable extent supplanted the older use of glass bottles in this industry.

However the conversion has not been made without problems. Because each carton is to be used only once, this means that the dairies each have to be provided with a continuous supply of cartons at a rate equal to their daily output of packaged products. At the present time, the cartons most popular in the dairy trade are of rectangular or square shape because they can be stored efficiently in containers for delivery to retail outlets and in refrigerators. These rectangular cartons are either set up complete, waxed and ready for filling by the carton manufacturer or they are semi-finished by the carton manufacturer and sold in knocked-down form. These knocked-down cartons have the side seam glued and are sold unwaxed. They are then set up and waxed at the dairy as needed.

The completely finished cartons comprise a considerable amount of bulk, the greater part, by far, of which is air, so that a large amount of shipping and storage space is required. Obviously the number of cartons that may be economically stored at a dairy is limited and, therefore, it is essential that a source of constant supply be close by to insure uninterrupted and regular delivery.

Knocked-down cartons require much less shipping and storage space but they do require a relatively large number of shipping containers because comparatively few can be packed to a container for convenient handling at the dairy. Furthermore, the labor required at the dairy to unpack these cartons and feed them into the magazine of the setting-up machines is quite considerable.

For reasons of economy and sanitation, it is neither convenient or desirable for the individual dairies to try to manufacture the paper cartons from the raw paper stock itself. The operations of printing, gluing and otherwise fabricating the cartons provide numerous problems with which the average dairy manager has neither the time, skill or desire to cope. The needed equipment to carry out these operations is quite considerable and to be economically feasible needs to be conducted on a much larger scale than that which is necessary to satisfy the needs of the usual dairy operator.

Therefore a principal object of the present invention is to provide improved means and methods of manufacturing cartons of the aforesaid type which will largely overcome these difficulties of the previously used procedures and will provide a completed carton at the lowest possible unit cost.

Another object of the invention is to provide a method for the continuous and high speed manufacture of cartons and/or blanks therefor that may be economically manufactured at one location, inexpensively transported to a carton assembler such as at a dairy, and there conveniently completed in a non-hazardous, simple and practical manner as required.

Another object of the invention is to provide as an article of manufacture or commerce, semi-finished cartons in roll form that may be economically shipped to the user and economically stored in a minimum of space.

Another object of the invention is to provide a method of manufacturing semi-finished cartons whereby the same may be conveniently and economically finished by a user in a manner that will not disrupt or otherwise interfere with his normal routine in preparing and packaging his milk fluid product.

With these and other objects of the invention in mind, I propose that the dairies be supplied with rolls of tightly coiled light weight pliable pressed fiber or cardboard which have been previously printed and adhesively coated in preselected areas by the manufacturer and further have indexing holes or other aligning means following a preconceived pattern, whereby the processed rolls can be unwound at the dairy as needed and the web therefrom fed through appropriate apparatus to be folded into cartons which are severed from the roll and wax-coated immediately ahead of the container filling and sealing operations in a continuous process. Because the only thing shipped to the dairy as well as stored by him will be the tightly-coiled rolls, the problems of bulk in shipping and storage will largely disappear.

Furthermore I contemplate a new design or lay out of carton blanks in the rolls such that substantially all the web is used and whereby the problem of waste paper and its disposal is kept at a minimum. The operations of folding, severing and waxing required of the user of such rolls are ones than can be conveniently conducted at the dairy and can be easily synchronized into the filling and top sealing operations now conducted at the dairy so that the process can start with unwinding the processed rolls and continue uninterruptedly through the filling and sealing of the milk filled cartons. Of consequence, not only does my invention as hereinafter described overcome the problem and expense of shipping and storing completed or partially completed cartons such as previously supplied the dairy, but since the tightly coiled rolls can be easily kept vermin-proof and clean until used, and since cartons can be conveniently formed therefrom in only such numbers as are required for a filling operation, much higher standards of sanitation can be maintained.

Preferably in accordance with the invention the adhesive which is applied by the manufacturer to the strands of carton blanks is of a type capable after application and evaporation of the solvent of bonding on contact to similarly coated areas of the paper stock but which will not bond to uncoated areas of the paper stock. This has the advantage that in the carton set-up operation which is conducted at the dairy no provision or interruption has to be made either to apply the adhesive or to allow it to set. Rather the mere act of folding and bringing the adhesive portions together suffices to obtain the desired bonding effect. The adhesive is, therefore, in accordance with the preferred form of my invention, applied to both sides of the carton blanks in areas or patches on the surfaces of the end flap forming portion and side seam forming portions which come into contact. However there is no problem from the paper sticking in the roll since it is a further feature of my present invention that the patches of adhesive are arranged in parallel lanes lengthwise of the sheet stock, the bounds of which are controlled so that they do not encroach into the bounds of an adjacent parallel lane of adhesive patches although disposed on the opposite side of the sheet. By this simple expedient, I make sure that no two areas of adhesive will come into contact with each other in the roll and the same can be freely rolled and unrolled.

I also contemplate that a thermo sensitive type of adhesive might be employed and which will have an advantage that it need be applied to only one side of the roll. This type of adhesive however does require application of heat to the lapped portions in the folding operation to effect the seal and to this extent will require some modification of the setting up process.

Many other objects, features and advantages of the invention will be apparent, or will become so, from the more specific description of the invention which now follows.

Referring now to the drawings in which like parts are identified by like reference numerals.

Figures 1, 3, 6:
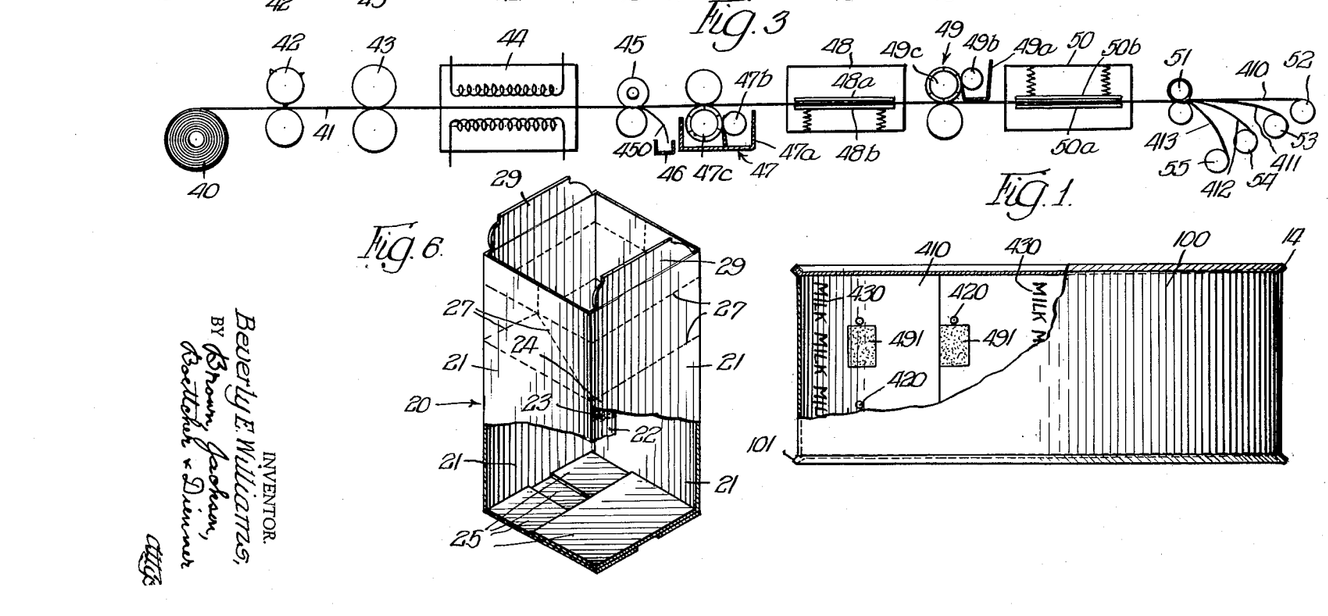
FIGURE 1 is a side elevational view of a roll of carton blanks formed in accordance with the invention and packaged ready for shipment and/or storage, a portion of the wrapper being cut away to expose the roll contained therein.
FIGURE 3 is a side elevational diagrammatic view of the sequence of steps illustrated in FIG. 2.
FIGURE 6 is a perspective view of a carton with one end closed ready for waxing and/or filling.
Figure 7:
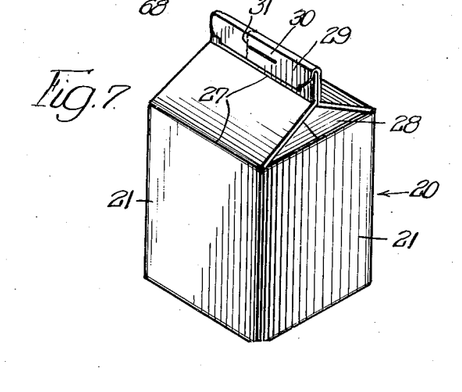
FIGURE 7 is a further view of the carton with the top end shown closed to illustrate one method of sealing its upper end after filling.

Referring first to FIGURES 6 and 7 and particularly to FIGURE 6, a carton 20 formed of sheet material such as light weight pliable cardboard, pressed wood fibres and the like formed in accordance with the present invention ready for filling is shown folded to have a generally rectangular shape with an open top and a closed flat bottom end so that it may stand erect for the filling operation. One of its four side panels 21 is provided with an integral attachment tab 22 which extends lengthwise thereof and is secured by a layer 23 of adhesive to the under side of marginal portion 24 of the adjacent side panel. Each of said side panels 21 further has a lower end flap 25 formed integrally therewith and which four end flaps are folded together into lapping relation with a layer of adhesive therebetween to close the bottom end. The carton is preferably wax-coated throughout in order to make the same water and/or liquid tight. The upper end of the side panels 21 are also preferably scored with fold lines as at 27 so that when filled with milk, orange juice or other fluid, the open top may be sealed by folding the upper portion of said panels 21 inwardly along said fold lines 27 to produce the gabled top effect 28 illustrated in FIGURE 7. Two oppositely disposed panels 21 further have flaps 29 one of which is folded in and the other over and stapled as at 30. Conventionally, the gabled top 28 is also provided with a suitable line of perforations 31 by which an opening may be formed therein to permit dispensing of the contents. Any other arrangement for closing and sealing the open top of the container and/or for dispensing the fluid contents from said sealed top may be utilized. The illustrated arrangement, however, is preferred as a convenient, simple and practical manner of obtaining the desired closure and sealing.

In order to avoid the problems of bulk in shipping and storage which result from the previous practice of having the entire operation conducted by the carton manufacturer at a location remote from where the cartons are to be used, the present invention proposes to divide the manufacturing operation into two stages whereby the dairyman or other user of cartons is supplied with long lengths or strands of end-connected carton blanks left flat and which can be shipped and stored in tightly coiled rolls which take up a minimum of space. The strands of carton blanks are however sufficiently processed that the dairyman can set up cartons from the furnished strands of connected blanks by threading the strand through a carton folding press as it is unwound, and be automatically supplied from said roll with cartons ready for waxing at any desired rate and preferably at a rate which can be synchronized into the waxing, filling and sealing operations practiced at the dairy so that there are no problems of storing or maintaining empty cartons for any period of time. Such a processed strand is illustrated at 410 in FIGURE 10 and in FIGURE 1 is shown tightly coiled in roll form and encased in a protective wrapper 100 and heat sealed or otherwise secured at its periphery 101 to provide a strong, water proof and vermin-proof sheath therefor. Although any suitable material may be used to form wrapper 100, I prefer to use a polyvinyl chloride coated paper or one comprising a first lamina of cloth, a second lamina of aluminum and an inner lamina of thin plastic material. I might also use, however, an asphalt-coated paper, an aluminum foil backed paper or so-called Krinkle-Kraft waxed paper. The desired seal may be obtained by heat sealing at 101 where a plastic coated wrapper is utilized or by using an appropriate adhesive or a gummed label.

Figure 2:
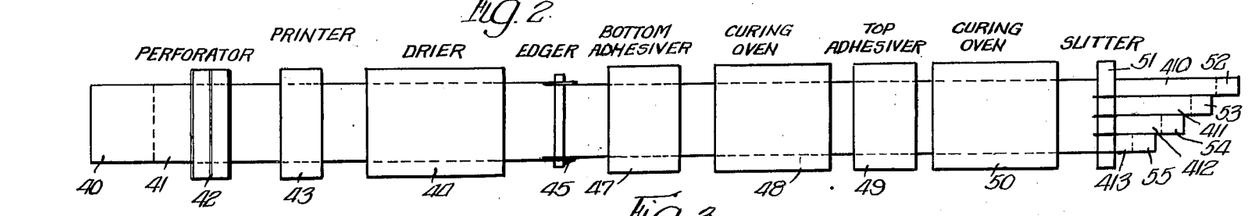
FIGURE 2 illustrates in diagrammatic form the various steps followed in the first stage of the process to manufacture a roll of carton blanks as illustrated in FIG. 1.
Figure 9:
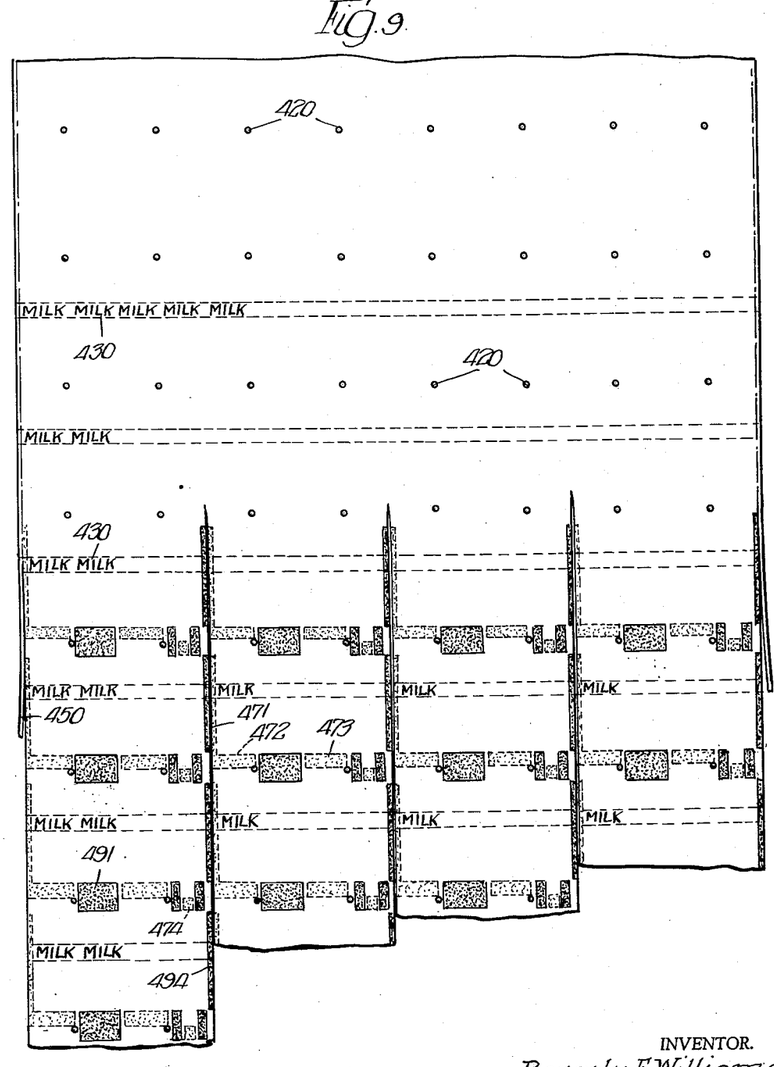
FIGURE 9 is a fragment of a web of sheet material fabricated according to the sequence of steps illustrated in FIGURES 2 and 3.

Referring now to FIGURES 2 and 3, 40 represents a tightly wound roll of material as supplied the manufacturer by the paper mill and from which a web 41 is unrolled and processed through the several apparatus diagrammatically illustrated. Said web 41 may be any convenient number of carton blanks wide and in FIGURES 2, 3 and 9 is shown wide enough to accommodate four lengths of cartons plus a narrow width along each side for edge trim.

Figure 10:
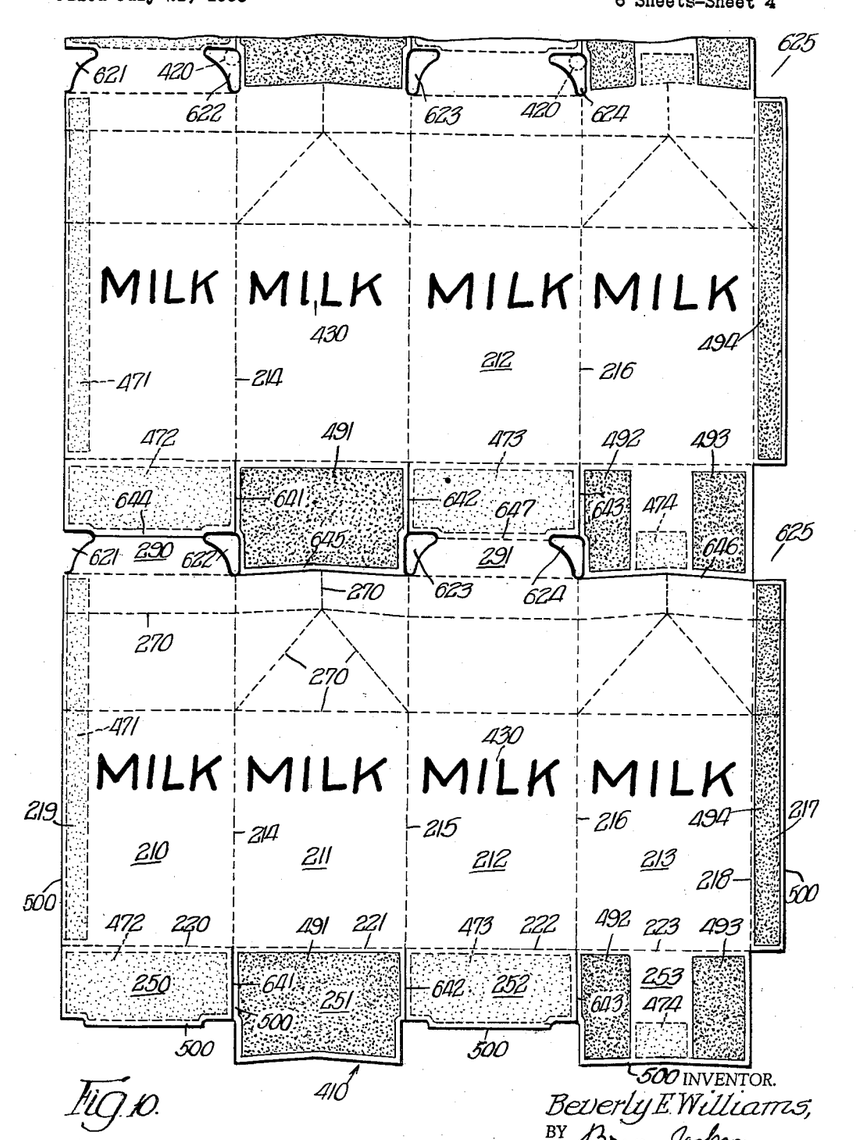
FIGURE 10 is a fragment of a web from the roll shown in FIGURE 1 that has been punched, scored with fold lines and the terminal blank partially severed from the remainder of the web ready for folding about the mandrel.

Referring now to FIGURE 10, a completed blank ready for folding about a mandrel in a step to be herein described is shown as comprising four side panels 210, 211, 212, 213 which extend lengthwise of the strand 410 and are separated by fold lines 214, 215 and 216. Side panel 213 also has a side or attachment tab 217 extending lengthwise of one side and is separated therefrom by fold line 218. When the side panels are folded into a rectangular shape along said fold lines, tab 217 is lapped beneath marginal portion 219 of side panel 210 and glued thereto. On their forward or leading end, panels 210, 211, 212 and 213 further have integrally formed end flaps 250, 251, 252 and 253, respectively, which are lapped together and glued to form the closed bottom end of the carton. The blank also includes fold lines indicated generally at 270 and side panels 210 and 212 further include flap portions 290 and 291 which correspond to the flaps 29 of the carton illustrated in FIGURE 6. As seen in FIGURE 10, the layout of the carton blanks is such there is little or no waste but essentially all of the strand 410 is required to form the blanks. The only actual waste is represented by punchouts 621, 622, 623, 624 and 625.

Returning now to FIGURES 2 and 3, the wide web 41 of raw paper stock is initially run through a rotary printing press equipped with a perforating station as at 42, one or more printing stations 43, and a drying tunnel 44. Such a press may be of any conventional type, one such being identified as an Aniline press manufactured by the Kidder Company, Dover, New Hampshire. Perforating station 42 is preferably located ahead of the printing stations 43 and serves to punch parallel rows of indexing holes 420 (see FIGURE 9) in the web 41 which serve as means to properly register the web with apparatus used in subsequent operations thereon. The indexing holes 420, as seen in FIGURE 9, are preferably arranged in parallel lanes and spaced apart in each lane the length of a carton blank. Preferably, they are located adjacent fold lines 214 and 216 so as to fall in potential waste areas indicated at 622 and 624 (FIGURE 10) about the bottom end flap forming portions of said web and which are subsequently removed. In the alternative, they may be located in any two of the end flap forming portions 250—253 but in portions thereof such that in the subsequent folding and adhesively securing operations, they will be covered and sealed by lapping flap portions. Said registration holes 420 not only serve to hold the web 41 in a predetermined alignment as it passes through the subsequent printing, drying and adhesive coating steps which comprise the first stage in the inventive process, but they also serve to properly locate the strand of cartons as it is later unwound from the roll and fed through the setting-up machine (FIGS. 4 and 5) to assure proper alignment of the fold lines with respect to the adhesive coated areas or patches on the strands of carton blanks. If desired, instead of holes 420, other indexing means such as appropriately located light sensitive marks might be formed on the web 41 for use in conjunction with a photo cell provided on the carton set-up machine. If light sensitive marks are to be used in place of the indexing holes considerable more latitude of location for the indexing means may be had but the same will still preferably be located at intervals equal to the length of a carton blank.

Figure 4:
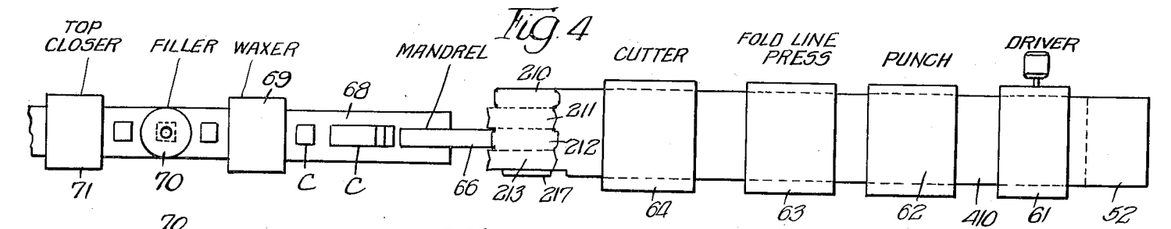
FIGURE 4 illustrates in diagrammatic form the steps constituting a further stage of the process and in which the rolled strand of perforated, adhesive coated and printed carton forming blanks shown in FIGURE 1 and which is obtained by the steps illustrated in FIGURES 2 and 3 is set-up, then waxed, filled with milk or other material and its open top sealed to produce a completed carton of milk or other material.

The perforated web 41 as it exits from the perforating station 42 is next passed through printing station 43 where identifying legend and/or other advertising material such as illustrated at 430 (see FIGS. 1, 9 and 10) is printed and then dried in drying tunnel 44. Although a single printing station 43 is illustrated in FIGURES 3 and 4, it will of course be understood that the printed material 430 may be provided in more than one color, and in which circumstance the number of printing stations will be multiplied as in accordance with well known conventional procedures.

Thereafter the web is passed through edge trimmer 45 and waste 450 is collected at 46. If desired this operation could be delayed until after the adhesive coating steps.

After printing and edge trimming has been completed, the wide web 41 then continues through further rotary presses 47 and 49 which apply a pressure sensitive adhesive coating to selected areas of the bottom and top sides respectively of said web, that is to those portions of the web which will ultimately constitute end flaps 250—253, tab 217 and margin 219 of the carton blanks where it will be needed to form a finished carton. The adhesive preferably comprises a rubber latex of high solids content mixed with a small amount of appropriate dispersing agent and plasticizer if desired. It is applied to the paper web while in liquid form as a thin film and which is then dried as by passing the surface of the web over a heated surface or through ovens 48 and 50 causing the liquid adhesive to congeal. One of the important characteristics of the selected adhesive is that after it congeals it will no longer stick to bare paper but will instantly weld to itself, on application of slight pressure, that is it will only bond to other adhesive coated areas. An example of such an adhesive is that sold by Swift & Company, Chicago, Illinois, and identified by them as Adhesive #3239. This adhesive is understood to comprise essentially a natural rubber latex 60% solids, and containing from 1 to 2% by weight of ammoniated casein as a dispersing agent. It has an approximate shelflife of 6 months to a year and is considered to be non-toxic. Any other adhesive possessing similar characteristics may, however, be used and is intended to be included within the scope of the invention. Where two surfaces are to be joined together in this manner it is necessary that both surfaces be pre-coated with the adhesive. Moreover, since the adhesive coated carton blanks are recoiled into tight rolls as illustrated in FIGURE 1 for shipping and storage before being set-up into complete cartons, it is essential that these adhesive areas be arranged in parallel lanes, the boundaries of which do not overlap. Were the lanes of adhesive on one side of the web permitted to overlap an adjacent lane of adhesive coated areas on the other side of the web, then at some point during recoiling of the web 41 it would be possible for adhesive on one side of the web to be brought into contact with adhesive on the opposite side of the web whereby adjacent turns of the coil would weld together and the strands of carton blanks could not be subsequently uncoiled. For this reason, referring to FIGURES 9 and 10, it will be seen that the adhesive which is applied to the bottom side of the web 41 or strands 410, 411, 412 and 413 by adhesive applicator 47 (represented in dotted lines as comprising areas 471 on margin 219, and areas 472, 473 and 474 on end flap forming portions 250 and 253) constitute lanes of adhesive patches paralleling the edge of the web but each of the lanes is separate from, and does not encroach within the boundaries of the adjacent lanes of adhesive areas applied by applicator 49 to the top side of said web and/or strands into which it is eventually divided. The latter are represented by full lines in FIGURES 9 and 10 and comprise areas 491, 492, 493 and 494 on each blank.

The adhesive areas are further sized, shaped and placed where they will not be cut through by cutter blade 51 or contacted by a press in the subsequent punching out of portions 621—625 to be described hereinafter. It has been found that the adhesive remains quite elastic. Consequently, if the paper is punched, sheared or slit through the adhesive film, it is not always totally severed and scrap may remain more or less attached to the base material which can move along into subsequent operations to cause trouble. To avoid this, I propose to locate the adhesive patches on the respective portions of the carton forming areas while leaving safe margins indicated generally at 500 in FIGURE 10 between the bounds of each of the adhesive patches and adjacent areas to be punched, slit or cut.

Although the adhesive may be applied simultaneously to both sides of the web 41, I have found it more desirable to apply the adhesive to each side in separate operations. Thus in FIGS. 2 and 3, I show web 41 as being passed through a first adhesive applicator as at 47 which includes a tank 47a of liquid adhesive, a feeder roll 47b and an applicator roll 47c suitably contour faced to apply the liquid adhesive to the underside of the strip in the required areas. The uncoated side of the strip is then preferably passed beneath heated plates 48a in an oven 48 which drive off the excessive vehicle in the adhesive. Desirably, means 48b comprising spring-urged rails which engage on the underside of the web between the adhesive lanes may be used to maintain the web in close proximity to the heated plate 48a and to prevent sagging. Obviously however, the pressure of means 48b should not be such as to bind or otherwise interfere with the free movement of the web between it and heated plate 48a. Desirably at this stage the web 41 may be recoiled before going to the next operation or one may precede directly thereto as illustrated in FIGS. 2 and 3. It has been found that approximately ten seconds in contact with heated surface 48a suffices to obtain congealing of the adhesive to a point where the strip may be recoiled without the adjacent layers sticking to each other. The web is then passed through the second adhesive applicator indicated at 49 and including a similar tank 49a, feeder roll 49b and suitably contour faced roll 49c which applies adhesive to the opposite side thereof and in the proper lanes as described previously. The adhesive is then preferably congealed, this time by passing the strip over heated rails 50a in chamber 50, these rails being only as wide as the boundaries of the newly applied adhesive. These rails serve to support the ribbon directly under the newly applied adhesive but are sufficiently narrow that they do not overlap or contact the lanes of adhesive previously applied to the underside of the strip 41 thereby to avoid dragging the congealed adhesive over the supporting surface.

Also if desired, a spring urged means 50b which engage the upper side of the web 41 may be used to obtain more positive contact of the web with the heated rails 50a and further to act as a steadying influence, btu in a non-binding manner, on the web as it passes through the oven to complete the drying portion of the process. However, instead of passing the strip 41 over heated rails or other surface the strip may be simply passed through a heated atmosphere while supported by strategically located and much narrower rails than indicated above.

After the adhesive applied to the second side of the ribbon has been congealed, the strip is passed through a rotary slitter 51 which cuts it into narrower strands 410, 411, 412 and 413, each one carton blank wide. If the wide web 41 has not been previously edged trimmed it can be done at this time. The narrower strands 410—413, as they are cut, are tightly coiled into rolls indicated at 52 through 55. These rolls are then enclosed in a vermin-proof and water resistant protective wrapper 100 (FIG. 1) for shipping and storage until required to be set up into cartons.

It has been found that printing and adhesive coating presses of the type referred to above may be operated in excess of 600 linear feet per minute which means that, for pint sized cartons, approximately nine hundred cartons can be produced per minute for each lane. Consequently, when printing a web of paper four cartons lanes wide one is able to produce 3600 cartons per minute or at the rate of 216,000 per hour. Obviously, also when printing multiple lanes, as many different customers trademarks and other identifying legend may be printed simultaneously as there are lanes. This gives good manufacturing flexibility.

What is rolled and packaged, as seen in FIGS. 1 and 10, for shipment to the dairies or other carton set-ups locations constitute in effect long strands of carton blanks joined together at their ends and on which have been printed the required identifying legends as well as adhesive patches and indexing holes 420 but which possess an otherwise smooth surface and have substantially uniform uninterrupted parallel opposed side edges whereby the same may be conveniently coiled into tight rolls in order to occupy a minimum amount of shipping and/or storage space. It has been found that a single roll such as illustrated in FIG. 1, 36 inches in diameter with a 10 inch core will contain 6700 one pint size cartons and a proportionately smaller number of larger sized cartons. Because so many cartons can be compressed into such a small volume, it is apparent that the packaging cost will be extremely low and therefore the manufacturer can afford to wrap the rolls in moisture proof, dirt proof, and vermin proof material as described above; thus assuring the utmost in clean and sanitary delivery of carton blanks to the dairy.

Figure 5:
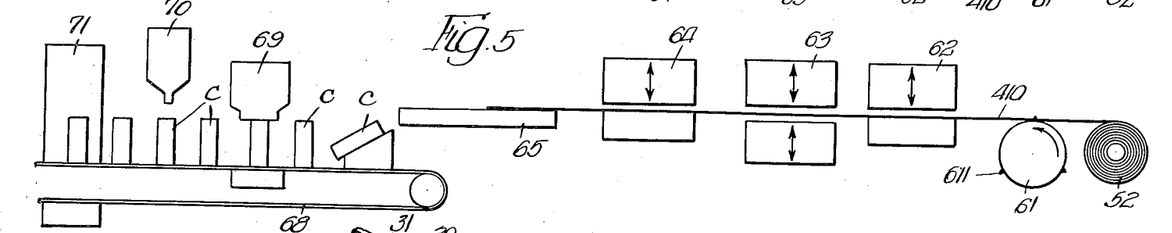
FIGURE 5 is a side elevational diagrammatic view of the steps illustrated in FIGURE 4.
Figure 8:
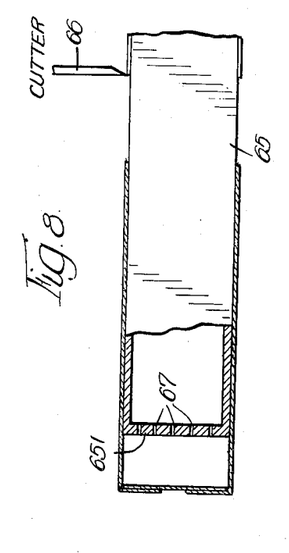
FIGURE 8 is an enlarged fragmentary view of the mandrel which is used in one step of the process and illustrates a carton ready for waxing being blown thereoff.
Figures 14, 15, 16, 17, 18:
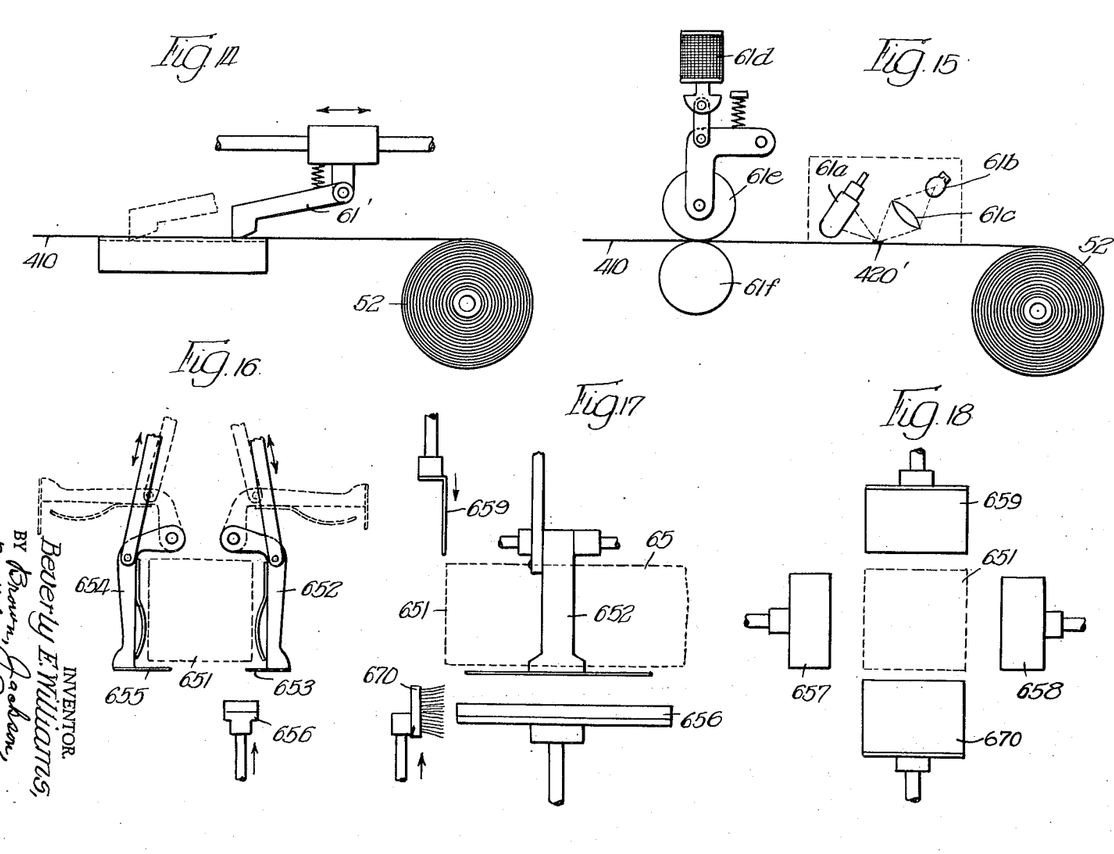
FIGURE 14 shows an alternate arrangement for controlled intermediate feeding of the roll of carton blanks through the steps illustrated by FIGURES 4 and 5.
FIGURE 15 shows a further arrangement utilizing a photocell wherein the index means on the roll of carton blank comprises light sensitive areas.
FIGURES 16, 17 and 18 show in diagrammatic form folding wings by means of which the end blank of the roll is folded about a mandrel into a one end closed carton.

These strands of carton blanks are thereafter completed at the dairy or other user by removing its wrapper 100 and mounting the roll at one end of a set-up machine as illustrated in FIGS. 4, 5 and 8 and feeding the unwound strand of carton blanks therethrough. FIGS. 4 and 5 illustrate in diagrammatic form the sequence of steps and/or apparatus to which the strands of carton blanks are processed in the set up machines. Thus in FIGS. 4 and 5 reference numeral 410 represents one of the strands of carton blanks into which web 41 was previously divided and which is fed from roll 52 by a motor driven rotary member 61 having spaced teeth 611 which cooperate with the indexing holes 420 so as to advance the strand one carton length (equal to one pitch distance between holes) for each machine cycle. Instead of a toothed feed roller any other suitable means such as a reciprocating feed bar 61' (FIGURE 14) might be utilized for this purpose. If the strands had been previously marked at station 42 with light sensitive markings 420' rather than the described perforations, then a photo cell 61a might be used as illustrated in FIGURE 15 to control the intermittent feed of the strand 410 through the succeeding stations and additional impelling means such as a pair of friction rollers 61e, 61f will be relied upon to obtain movement of the strand 410 under control of the photo cell 61a. Thus light from a source 61b might be directed by an optical system 61c onto a given spot such that a marking 420' coming under the spot will affect light directed to the photocell 61a which acts as a switch in the electrical circuit of the solenoid control 61d for roller 61e. At the next station, reciprocating punch 62 serves to punch out areas represented by 621, 622, 623, 624 and 625 in FIG. 10 and which constitute waste materials surrounding the tuck-in end flaps which form the bottom of the completed carton. These punched out areas also include the perforations 420 which are no longer required. Strand 410 then continues to the next station 63 where fold lines 214, 215, 216 and 218 between the side panels 210, 211, 212, 213 and side flap 217 are pressed. Also at this station the fold lines indicated generally at 270 which are relied upon in closing the open end of the completed carton after filling to form the aforementioned gable top 28 are also simultaneously formed. Although conceivably these fold lines could be formed by the manufacturer as a further step in the processing illustrated by FIGS. 2 and 3 it would not be possible thereafter to as tightly coil the strands into a roll and it has been found as convenient to conduct this step in the carton set up machine immediately ahead of the actual folding and thereby permitting packaging more carton blanks to a cubic foot. The strand of carton blanks 410 then continues to a third station where cutter 64 forms slots 641, 642 and 643 between the flaps in order to permit later folding of the flaps 250—253 during the end closing operation and at which time the terminal carton blank is also simultaneously severed along lines 644, 645 and 646 from the rest of the strand. The connecting fibers at 647 which thereafter alone serve to hold the terminal blank to the strand have been found sufficient to permit propelling the end carton blank to the two succeeding stations where the actual folding operation is accomplished.

At the first of these two folding stations, the terminals blank has its connected side panel 212 overlying rectangular mandrel 65 and its panels 210, 211 and 213 free. Folding wings 652 and 653 (FIGURES 16 and 17) engage panel 213 and tab 217 to wrap them around one side and the bottom side of the mandrel. Other folding wings 654 and 655 then engage side panels 211 and 210, wrapping them around the opposite side of the mandrel and so that the marginal portion 219 of panel 210 overlies the attachment tab 217 on the underside of the mandrel 66. Adhesive patches 471 and 494 provided on portions 219 and 217 are thereby brought into contact with each other and, by the action of the folder 656, pushed together with light pressure to obtain an instantly welded strong joint. Because of the type of adhesive utilized no machine time is lost in waiting for the adhesive to set.

The carton blank which now comprises a rectangular tube completely surrounding the mandrel is next propelled along the mandrel by the succeeding intermittent movement of drive member 61 so as to locate the fold lines 220, 221, 222 and 223 of the carton blank in alignment with the end 651 of the mandrel. The propelling movement of the now rectangular tube shaped carton blank may be aided by a supplementing feed bar (not shown) which will engage the trailing edge of the rectangular tube as for example along edge 645. At this second folding station (FIGURES 17 and 18), a further folder 657 will engage flap 251, then folder 658 engages flap 253, folding them at right angles and against the flat end 651 of the mandrel 65. Another folder 659 then bends flap 252 at right angles across flaps 251 and 253. Following this, still another folder 670 bends flap 250 over the top of the three previously folded flaps and exerting pressure on the pile of four flaps sufficient to weld them into a strong bottom panel. Adhesive patch 474 on flap 253 bonds with the centrally located adhesive patch flap 251. Adhesive patch 473 on end flap 252 bonds with the overlapped portion of patch 492 on flap 253 and patch 472 bonds with adhesion patch 491 and flap 251. As flap 250 is folded into position, its adhesive patch 472 comes into contact with the remaining uncovered portions of adhesive patch 491 on flap 251 and adhesive patch 493 on flap 253 to complete the sealing of the end of the carton. Simultaneously with the folding of the end flaps, a knife blade indicated at 66 (FIG. 8) cooperating with a fixed blade (not shown) on the mandrel 65 cuts the completely formed carton away from the strand along connecting fibre line 647 whereupon the carton is blown off the mandrel by air pressure through jets 67 in the end of the mandrel and the semi-finished carton C is dropped onto a conveyor belt indicated generally at 68. The completed cartons indicated generally at C are thereupon removed to the waxing station 69 where preferably both the interior and exterior surfaces including the bottom of the semi-finished cartons C are coated with wax. Thereafter the waxed cartons C continue to filling station illustrated diagrammatically at 70 and thereafter the open top end is closed as at 71 by folding along fold lines 270 in conventional manner as previously described and stapling to produce a completed filled carton as illustrated at 28 in FIG. 7. Provision may be had for automatically loading said filled cartons into containers if desired. Preferably also between waxer 69 and filler 70, the cartons C pass through refrigerating or other chilling means to quickly cool the wax coating. From the above it will be seen that the entire operation beginning with unwinding the processed paper 410 from roll 52 through the carton completing, waxing, filling and top closing may be accomplished by a single machine automatically and with a minimum of supervision to be sure that there is a constant supply of paper, wax, filling material such as milk and staples required for the top closing step.

Figure 11:
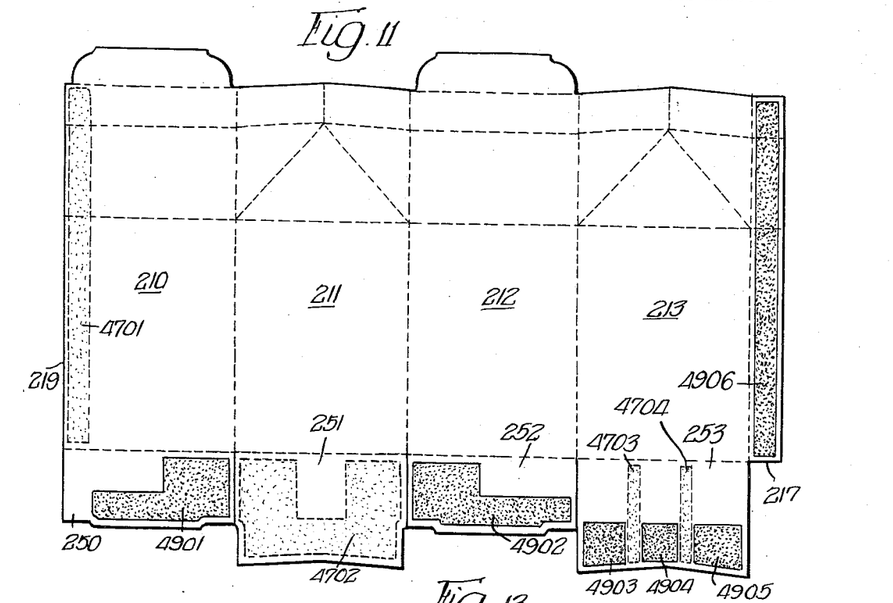
FIGURES 11, 12 and 13 are views of alternate arrangements in which the adhesive coating may be applied to the blanks and/or strands thereof.

Other sequences of folding end flaps 250—253 than that thus far described might also be followed. Thus for example, FIGURE 11 illustrates a carton blank having adhesive areas applied to the underside of the web by means 47 at 4701 on margin 219 of panel 210, at 4702 on end flap 251, and at 4703 and 4704 on flap 253. Means 49 would apply similar adhesive to the opposite or underside of the web at 4901 on flap 250, at 4902 on flap 252, at 4903, 4904 and 4905 on flap 253 and at 4906 on attachment tab 217. The side panels 210—213 and tab 217 would be wrapped about the mandrel 66 in the sequence previously described, but this time, flap 252 would be folded first over the end 651 of the mandrel, then flap 250, then flap 253 and finally flap 251 so that the larger flaps 251 and 253 would constitute the outer exposed layers of the bottom panel.

Figure 12:
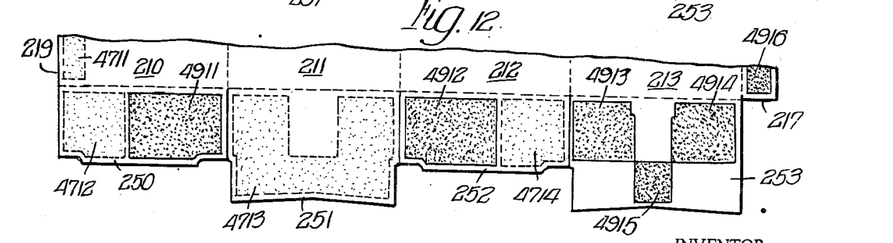

FIGURE 12 illustrates a further possibility wherein flap 253 is the first flap folded over the end 651 of the mandrel. Then in succession flaps 250, 252 and 251 are folded which results in the two narrower flaps 250 and 251 being sandwiched between the larger flaps 251 and 253. To accomplish this adhesive is applied to the underside of the web by means 47 at 4711 on margin 219, at 4712 on flap 250, at 4713 on flap 251 and at 4714 on flap 252. Similar adhesive is also applied to the top side of the web by means 49 at 4911 on flap 250, at 4912 on flap 252, at 4913, 4914 and 4915 on flap 253 and at 4916 on tab 217.

Figure 13:
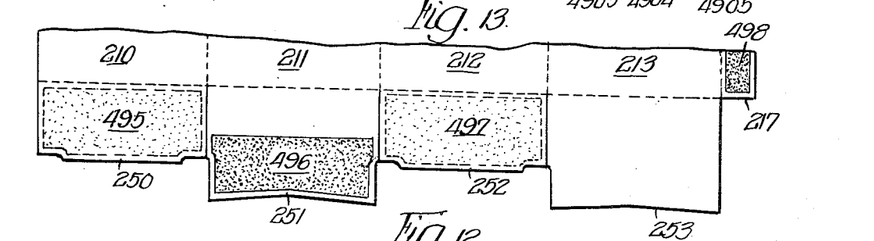

While pressure sensitive adhesive such as aforedescribed has an important advantage in speeding set up of cartons from the supplied strands 410 of carton blanks, other types of adhesive may be used to accomplish the same over all objectives. For example the portions of web 41 forming the end flaps, attachment tab 217 and/or margin 219 of the carton blanks might be coated with a thermoplastic adhesive at stations 47 and/or 49 rather than with the aforementioned pressure sensitive contact type adhesive. In such an instance, the thermo-plastic adhesive would be applied hot and allowed to cool before the strands were wound into coils. Because this type of adhesive need not be applied to both surfaces to obtain a bond, all of the adhesive necessary to form a carton could be deposited on one side only of the web 41. Furthermore because this type of adhesive will not stick to either itself or the paper unless actuated by heat, no provision need be made to avoid one adhesive patch contacting another adhesive patch while coiled in a roll. However in order for the same to be utilized in the carton set-up machine some provision will have to be made for applying heat during the folding operations about the mandrel. A suitable adhesive would be one that would not soften substantially below 125° F. but would be sufficiently fluid at near 300° F. to permit convenient application thereof to the web 41. Swift and Company's Hot Melt Adhesive #3318 is an example of an appropriate thermoplastic adhesive. It is understood to be non-toxic and to comprise an anhydrous mixture of polyvinyl acetate, natural gum rosin and plasticizer, 100% solids. Any other appropriate thermoplastic heat-sealable, non-toxic adhesive as for example a pyroxylin based adhesive could be used. FIGURE 13 shows such an adhesive applied to only one side of a carton blank on flaps 250, 251 and 252 in areas represented at 495, 496 and 497 respectively and also lengthwise of attachment tab 217 as at 498, assuming the same sequence of folding is followed as previously described in connection with the preferred embodiment shown by FIGURE 10. Since the adhesive areas 495 through 498 will stick directly to paper when softened and then cooled, the adhesive need not be applied to both sides of the blank. However, the adhesive could be applied to both sides of the blank in the areas illustrated in FIGURES 9 and 10 so as to rely on a bond achieved by bringing two adhesive areas into contact to weld together when heated and subsequently cooled.

From the above description, it will be seen that the invention contemplates a high speed manufacture of paper milk containers or the like by a continuous process which includes, in one stage, single or multi-color printing on one side of a web from a roll of pliable pressed fibres such as cardboard, the application thereto of either heat sensitive or preferably pressure sensitive adhesive which will not stick in the roll but only on contact with itself and which further contains perforations or other indexing means wherefor the treated web may be recoiled into tight rolls, protected and sheathed against vermin, moisture etc. for economical shipping and storage and later unwound as required, slit, folded about a mandrel into the shape of a carton having one end closed, the lapping parts sealed on contact and/or heat if required, and wax-coated ready for filling with a measured amount of fluid such as milk and the open top closed and sealed ready for delivery to the consumer.

From the described process and apparatus many advantages are to be derived.

From the aforesaid description of the invention it will be seen that the invention and the objects thereof can be obtained and practiced in a convenient simple and practical manner.

Having described my invention, I claim:

1. In the process of manufacturing cartons from sheet stock, the steps which comprise unrolling a strand of carton blanks having pre-adhesive-coated portions which are to be lapped with other portions, partially severing the end one of said blanks from the strand, folding it about a mandrel and lapping said pre-adhesive-coated portions thereof with other portions of said end blank to shape said blank to the form of a carton having one end closed, securing said lapped portions together and separating the thus-completed carton from the remainder of the strand.

2. In the process of manufacturing cartons from stock, unrolling a strand of carton blanks having pre-adhesive-coated portions which are to be lapped with each other, partially severing the end one of said blanks to permit folding them to the form of cartons and so that said pre-adhesive coated portions lap, so folding the end blank, effecting a bond between said lapped pre-adhesive coated portions, and then completing the separation of the blank from said unrolled strand.

3. In the process of manufacturing cartons from a strand of flat carton blanks having a pattern of pre-adhesive coated portions which lap with other portions in the completed cartons, the steps which comprise scoring each blank with a pattern of fold lines related to said pattern of pre-adhesive coated portions, partially severing the end blank from the strand, folding the end blank along said fold lines and so as to lap said pre-adhesive coated portions with other portions of the folded carton blank, activating said pre-adhesive coated portions to effect a bond between said lapped portions to complete the forming of a carton from said blank, and separating said blank from the strand as it is formed into a carton.

4. In the process of manufacturing paper cartons having side panels with a side tab along one panel lapping and adhesively secured to the margin of another panel and wherein each panel further has an end flap overlapped and adhesively secured with end flaps of the other panels to close one end of the completed carton, the steps which comprise unwinding a coil of paper stock and feeding the same lengthwise through a plurality of stations, in one of which stations the paper stock is regularly perforated in lines spaced apart a distance equal to the width of said side panels and a intervals equal to the length of the said side panels and their end flaps, and in other of which stations adhesive is applied to both sides of said paper stock in preselected areas arranged in parallel lanes extending lengthwise of the paper stock, said areas occurring at intervals corresponding to the spacing of perforations in each line thereof, said adhesive being of the type incapable of bonding to uncoated areas of the paper stock on contact, said adhesive areas further being selected only from those portions of the surfaces of the paper stock which correspond to the end flaps, side tab and margin of the panel which lap when folded to form a carton with one closed end, and thereafter tightly rolling said perforated, printed and adhesive paper stock into coils.

5. In the process of manufacturing paper cartons having side panels with a side tab along one panel lapping and adhesively secured to the margin of another panel and wherein each panel further has an end flap overlapping and adhesively secured with end flaps of the other panels to close one end of the completed carton, the steps which comprise unwinding a coil of paper stock and feeding the same lengthwise through a plurality of stations, in one of which stations the paper stock is regularly perforated in lines spaced apart a distance equal to the width of said side panels and at intervals equal to the length of the side panels and their end flaps, and in other of which stations adhesive is applied to both sides of said paper stock in preselected areas arranged in parallel lines extending lengthwise of the paper stock, said areas occurring at intervals corresponding to the spacing of the perforations in each line thereof, said adhesive being capable of bonding on contact with a second adhesive coated area but being incapable of bonding to uncoated areas of the paper stock on contact, said adhesive areas being selected only from those portions of the surfaces of the paper stock which corresponds to the end flaps, side tab of paper and margin of the panel which when assembled lap to form a carton including a closed end thereof, and said areas further being selected that no portion thereof lies within the bonds of an adjacent line of adhesive areas provided on the opposite surface of the paper stock, and thereafter tightly rolling said perforated, printed and adhesived paper stock into coils, whereby the same may be covered with a protective wrapper ready for shipment to a user who will fold and sever sections of said paper stock into cartons as required.

6. In the process of manufacturing paper cartons having side panels with a side tab along one panel lapping and adhesively secured to the margin of another panel and wherein each panel further has an end flap overlapped and adhesively secured with end flaps of the other panels to close one end of each completed carton, the steps which comprise unwinding a coil of paper stock and feeding the same lengthwise through a plurality of stations, in one of which stations the paper stock is regularly perforated in lines spaced apart a distance equal to the width of said side panels and at intervals equal to the combined length of the side panels and their end flaps, of carton blanks to be formed from said paper stock, in another of which stations the paper stock is printed on one side with identifying legend and in the remainder of which stations adhesive is applied to the two sides of said paper stock in preselected areas thereof arranged in parallel lanes extending lengthwise of the paper stock, said areas of each lane occurring at regular intervals corresponding to the perforations in each line thereof, said adhesive being capable of bonding on contact with a second adhesive coated area but being incapable of bonding to uncoated areas of the paper stock on contact, said areas being selected to include only those portions of the surfaces of the paper stock which corresponds to the end flaps, side panel and side tab of the paper carton blanks to be formed therefrom and which when properly folded lap to form the carton, and said areas further being selected that no portion thereof lies within the bounds of an adjacent lane of areas provided on the opposite surface of the paper stock, thereafter tightly rolling said perforated, printed and adhesive paper stock into coils, and covering the same with a protective cover ready for shipment to a user who will fold and sever sections of said paper stock into cartons as required.

7. In the process of manufacturing paper cartons having four side panels with a side tab along one panel lapping and adhesively secured to the margin of another panel and wherein each panel further has an end flap overlapped and adhesively secured with end flaps of the other panels to close one end of the completed carton, the steps which comprise unwinding a coil of paper stock and feeding the same lengthwise through a plurality of stations, in one of which stations the paper stock is regularly perforated in lines spaced apart a distance equal to the width of said panels and at intervals equal to the length of the side panels and their end flaps, in another of which stations the paper stock is printed on one side with identifying legend and in the remainder of which stations thermo-sensitive adhesive is applied to both sides of said paper stock in preselected areas arranged in parallel lanes extending lengthwise of the paper stock, said areas occurring at intervals corresponding to the perforations in each line thereof, said adhesive being incapable of bonding to uncoated areas of the paper stock on contact, said adhesive areas being selected from those portions of the surfaces of the paper stock which corresponds to the end flaps, side tab and margin of the side panel which when assembled lap to form a carton, and thereafter tightly rolling said perforated, printed and adhesive paper stock into coils, and covering the same with a protective wrapper ready for shipment to a user who will fold and sever sections of said paper stock into cartons as required.

8. Carton forming material comprising a tightly coiled web of pliable sheet material with substantially uninterrupted parallel side edges, said web being effectively divided into sections which may be folded into a carton having four side panels each with an end flap and an attachment panel along the side of one panel, said web being printed on one side, having lanes of guide holes located at regular intervals one to a section adjacent the bounds of the four panel forming areas in the region of the end flap forming portions of each section, said web further having non-lapping parallel lanes of adhesively coated non-contiguous areas arranged in similar intervals which constitute the mentioned attachment tab and end flap forming portions, said adhesive being of the type which will not bond on contact directly to the surface of adjacent portions of the web with which it engages when tightly coiled, and a moisture-resistant and vermin-proof wrapper protectively enclosing said tightly coiled web.

9. Carton forming material according to claim 8 wherein said adhesive coated areas constitute a layer of thermo-sensitive adhesive.

10. Carton forming material according to claim 8 wherein said adhesive coated areas each constitute a layer of pressure sensitive adhesive of the type which will bond on contact with other similarly adhesive-coated areas but is incapable of bonding to uncoated areas of the paper stock and said areas further being arranged in lanes on both sides of the paper stock and with no portion of an adhesive coated area of one lane encroaching within the bounds of an adjacent lane of such areas provided on the opposite surface of the paper stock.

11. As a manufacture, a strand of connected carton forming blanks which have been coiled into a roll, said blanks each having spaced non-contiguous adhesive-coated portions to bond with other portions of said blanks with which they lap in cartons formed from said blanks, said adhesive-coated portions being arranged in parallel lanes on opposite sides of the strand extending lengthwise thereof and so that no portions of one lane encroach on an adjacent lane of such adhesive coated portions provided on the opposite side of the strand, said strand further having substantially parallel uninterrupted opposed side edges and registration means spaced inwardly of said opposed edges.

12. As a manufacture, a strand of connected carton forming blanks which have been coiled into a roll, said blanks each having similarly located index means and a pattern of spaced non-contiguous adhesive-coated portions related to said index means to bond with other portions of said blanks with which they lap in cartons when said blanks are folded with reference to said index means, said adhesive-coated portions being in non-contacting relation in the roll, said strand further having substantially parallel uninterrupted opposed side edges, and said roll being encased in a moisture resistant and vermin-proof protective wrapper.

13. In a packaging process, the steps which comprise applying a pattern of non-contiguous patches of adhesive-coating to sheet stock at pre-selected regular intervals so as to coat areas of sheet stock which are to be joined to other areas thereof when said sheet stock is folded into a carton, coiling the thus adhesive-coated sheet stock in roll form, thereafter unrolling said adhesive-coated sheet stock, and partially severing an end portion of said sheet containing one such pattern as it advances into a station, there folding the partially severed portions into cartons as required with one end open, bonding the sheet stock in said form by means of said pre-adhesive coated portions, separating such formed cartons from the remainder of said strand, waxing the formed carton, filling the carton through its open end with material to be packaged and thereafter closing and securing its open end.

14. In a packaging process, the steps which comprise unrolling a strand of connected carton blanks having pre-adhesive coated portions, in succession, partially severing the end one of said blank from the strand folding said blanks to the form of a carton having an open end and a closed end, bonding said blank in said form by means of said pre-adhesive coated portions, separating the formed carton from the remainder of the strand, only then filling said formed carton through its open end and thereafter closing the open end thereof.

15. A process of manufacturing a strand of milk carton blanks from a roll of paper stock which may be conveniently completed at a dairy by the steps of folding and severing each completed carton from the remaining blanks as it is required for packaging milk, said process comprising the steps of uncoiling the roll of paper stock, perforating the uncoiled paper stock at regular intervals corresponding to the longest axial dimension of a carton forming blank, applying adhesive at similar intervals in non-contiguous areas along parallel lines extending in the direction of movement of the paper stock as it is uncoiled such that each of the portions between the perforations may be subsequently folded along lines related to said perforations and then severed to produce a one-end-opened carton in which the adhesive applied areas are lapped to retain the carton in its assembled form, then tightly recoiling said paper stock into its original roll form and enclosing it in a moisture-resistant and vermin-proof cover ready for shipment and storage until required for packaging milk.

16. A process of packaging dairy products and the like which comprises the steps of unrolling a web of paper stock having indexing means at regular intervals and non-contiguous adhesived areas therebetween, guiding said web by means of said indexing means into a predetermined alignment with a mandrel, there folding the portion of the web between its outer end and the nearest indexing means along lines disposed between said non-contiguous adhesive coated areas to lap said adhesive-coated areas and form said portion into a carton having the shape of said mandrel with its outer end closed and its inner end attached to the web adjacent said nearest indexing means, then severing said formed carton from the web, moisture-proofing the carton, and, when suitably moisture-proofed, filling it through its open end and sealing said open end.

17. A process of packaging which comprises the steps of unrolling a web of paper stock having indexing means at regular intervals and non-contiguous adhesived areas therebetween, guiding said web by means of said indexing means into a predetermined alignment with a mandrel, there folding the portion of the web between its outer end and the nearest indexing means along lines disposed between said non-contiguous adhesive coated areas to lap said adhesive-coated areas and form said portion into a carton having the shape of said mandrel with its outer end closed and its inner end attached to the web adjacent said nearest indexing means, then severing said formed carton from the web, filling it through its open end, and sealing said open end.

18. In the process of manufacturing cartons from long lengths of sheet stock, the steps comprising first applying index means to said sheet stock at regular intervals along their length to indicate those portions thereof to constitute carton forming blanks, then applying adhesive to said sheet stock in pre-selected non-contiguous patches arranged in parallel lanes extending lengthwise of the sheet stock and at intervals in each lane determined by the spacing of the index means so as to be applied only to those areas of the sheet stock which are to be joined to other areas thereof when the portions constituting blanks are subsequently folded and severed from the length of sheet stock along lines extending between said areas, and tightly coiling the thus adhesive coated length of sheet stock into roll form whereby the same may be conveniently shipped and stored ready for unrolling and folding into cartons.

19. In the process of manufacturing cartons from long lengths of sheet stock the steps comprising first applying index means to said sheet stock at regular intervals along their length thereof to indicate those portions thereof which constitute carton forming blanks, then applying adhesive to said sheet stock in pre-selected non-contiguous patches arranged in parallel lanes extending lengthwise of the sheet stock and at intervals in each lane determined by the spacing of the index means so as to be applied only to those areas of the sheet stock which are to be joined to other areas thereof when the portions constituting blanks are folded and severed from the sheet stock to form cartons, thereafter coiling the thus adhesive-coated sheet stock into tight rolls, and when ready to be formed into cartons, unrolling said rolls of adhesive-coated sheet stock and joining the adhesive patch bearing areas of each of its carton forming blank portions with other areas thereof by folding and severing said portions from the sheet stock along lines related to said index means so as to fall between the non-contiguous patches of adhesive.

References Cited in the file of this patent

UNITED STATES PATENTS

| | | |
|---|---|---|
| 1,936,136 | Lindgren | Nov. 21, 1933 |
| 2,174,514 | Mothersall | Oct. 3, 1939 |
| 2,498,197 | Baxter | Feb. 21, 1950 |
| 2,576,542 | Schoen | Nov. 27, 1951 |
| 2,769,290 | Harriman | Nov. 6, 1956 |
| 2,831,304 | Michaud | Apr. 22, 1958 |